US009472818B2

(12) United States Patent
Kilmer (10) Patent No.: US 9,472,818 B2
(45) Date of Patent: Oct. 18, 2016

(54) FUEL CELL WATER DRAIN VALVE CONTROL WITH VEHICLE TILT COMPENSATION

(71) Applicant: GM GLOBAL TECHNOLOGY OPERATIONS LLC, Detroit, MI (US)

(72) Inventor: Derek S. Kilmer, Pittsford, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 527 days.

(21) Appl. No.: 13/919,393

(22) Filed: Jun. 17, 2013

(65) Prior Publication Data

US 2014/0370413 A1    Dec. 18, 2014

(51) Int. Cl.
*H01M 8/04* (2016.01)
*B60L 11/18* (2006.01)

(52) U.S. Cl.
CPC ............ *H01M 8/04* (2013.01); *B60L 11/1883* (2013.01); *H01M 8/04164* (2013.01); *H01M 8/04313* (2013.01); *H01M 8/04828* (2013.01); *H01M 8/04492* (2013.01); *H01M 2250/20* (2013.01); *Y02E 60/50* (2013.01); *Y02T 90/32* (2013.01); *Y02T 90/34* (2013.01); *Y10T 137/0324* (2015.04)

(58) Field of Classification Search
None
See application file for complete search history.

(56) References Cited

U.S. PATENT DOCUMENTS

| | | | | |
|---|---|---|---|---|
| 2003/0031907 A1* | 2/2003 | Gottesfeld | ........ | H01M 8/04186 429/430 |
| 2011/0003215 A1* | 1/2011 | Tanaka | .............. | H01M 8/04156 429/413 |
| 2012/0115055 A1* | 5/2012 | Wake | ................ | H01M 8/04141 429/414 |

* cited by examiner

*Primary Examiner* — Ula C Ruddock
*Assistant Examiner* — Matthew Van Oudenaren
(74) *Attorney, Agent, or Firm* — Phillips Ryther & Winchester; John P. Davis (57) ABSTRACT

System and methods for removing water and/or other liquids from a fuel cell system at a variety of vehicle tilt orientations are disclosed. In certain embodiments, a method for regulating a sump system in a vehicle may include receiving orientation information from one or more orientation sensors associated with the vehicle and/or the sump system. Based on the orientation information, an adjusted fill level of the sump system may be determined (e.g., using a look-up table or the like). A drain valve of the sump system may be selectively actuated to regulate a level of liquid in the sump system at or below the adjusted level.

11 Claims, 4 Drawing Sheets

FUEL CELL WATER DRAIN VALVE CONTROL WITH VEHICLE TILT COMPENSATION

TECHNICAL FIELD

This disclosure relates to fuel cell systems. More specifically, but not exclusively, this disclosure relates to systems and methods for collecting water from a fuel cell system included in a vehicle.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., electric drive motors and the like) and/or via an intermediate battery system. A FC may include a single cell or, alternatively, may include multiple cells arranged in a stack configuration.

In certain circumstances, water and/or other liquids may be produced as a result of operating a FC system. For example, water may be produced as a byproduct of a chemical reaction in a FC system reactor. The presence of liquid water in certain components in a FC system, however, may have detrimental effects on the performance of the FC system. For example, the presence of liquid water in a stream supplying a FC reactor (e.g., a gas stream) may have negative effects on the performance of the FC reactor.

SUMMARY

Systems and methods are presented for removing water from a FC system at a variety of vehicle tilt orientations. In certain embodiments, water may be removed from a FC system using a separator and sump system. The sump may be configured to collect water from one or more locations in the FC system. A selectively-actuated drain valve may remove the water from the sump for disposal and/or storage (e.g., in a reservoir or the like for reuse in the vehicle and/or the FC system). The drain valve may be configured to regulate a fill level and/or fill volume within the sump based on a tilt orientation of the vehicle. For example, on level ground, the fill level within the sump may be regulated at a first level, whereas in a tilted orientation the fill level may be regulated a second level that is different than the first level. Regulating the fill and/or volume level in the sump based on vehicle orientation may mitigate the potential for water and/or other liquids stored in the sump to escape and reenter the FC system.

In certain embodiments, a method for regulating a sump system in a vehicle may include receiving orientation information from one or more orientation sensors associated with the vehicle and/or the sump system. Based on the orientation information, an adjusted fill level of the sump system may be determined (e.g., using a look-up table or the like). A drain valve of the sump system may be selectively actuated to regulate a level of liquid in the sump system at or below the adjusted level.

In further embodiments, a system may include a FC system and a sump coupled to the FC configured to collect liquid (e.g., water or the like) from the FC system. The sump system may comprise a drain valve configured to remove liquid from the sump system when actuated. A FC control system and/or other suitable system may be configured to regulate a fill level within the sump system based on orientation information received from one or more orientation sensors by selectively actuating the drain valve.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may allow for efficient operation of a sump system at a variety of vehicle tilt orientations. In certain embodiments, water or other liquids may be removed from a FC system included in a vehicle using a sump. A selectively-actuated drain valve may remove the water from the sump for disposal and/or storage. Consistent with embodiments disclosed herein, the drain valve may be actuated in a manner that regulates a fill level and/or fill volume within the sump based on an orientation of the vehicle. Regulating the fill and/or volume level in the sump based on vehicle orientation may, among other things, mitigate the potential for water and/or other liquids stored in the sump to escape the sump and reenter the FC system.

Figure 1:
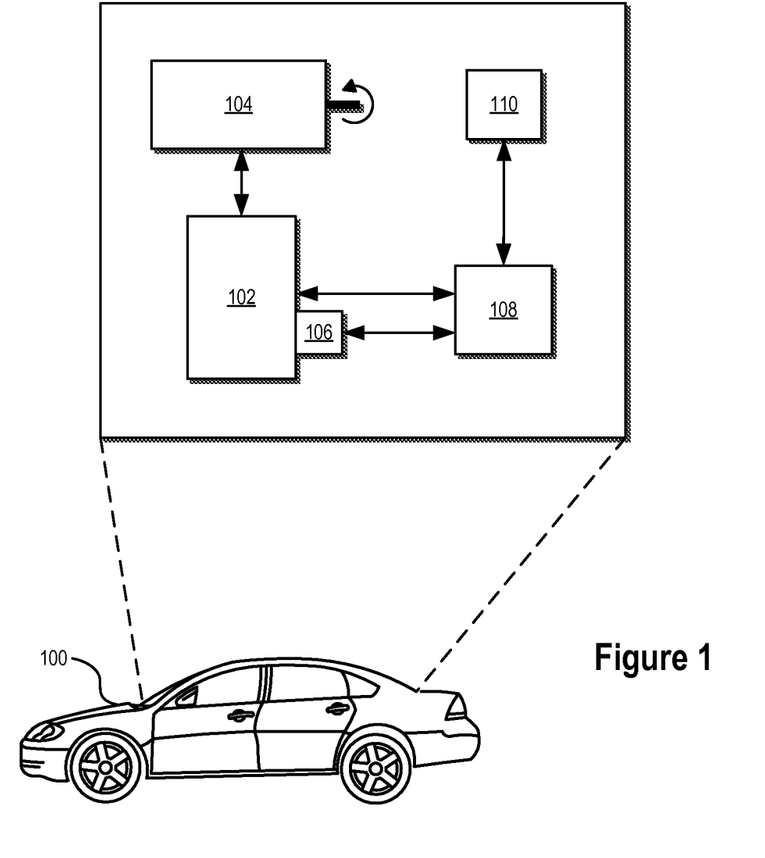
FIG. 1 illustrates an example of a system for collecting water from a FC system in a vehicle consistent with embodiments disclosed herein.

FIG. 1 illustrates an example of a system for measuring operating parameters of a FC system 102 in a vehicle 100 consistent with embodiments disclosed herein. The vehicle 100 may be a motor vehicle, a marine vehicle, an aircraft, and/or any other type of vehicle, and may include any suitable type of drivetrain for incorporating the systems and methods disclosed herein. As illustrated, vehicle 100 may include a FC system 102 configured to provide electrical power to certain components of the vehicle 100. For example, FC system 102 may be configured to provide power to electric drivetrain components 104 of the vehicle 100. The FC system 102 may include a single cell or multiple cells arranged in a stack configuration.

As illustrated, the FC system 102 may be configured to directly provide power to electric drivetrain components 104. In certain embodiments, the FC system 102 may be configured to provide power to electric drivetrain components 104 via an intermediate battery system (not shown). In further embodiments, the FC system 102 may be configured to provide power to one or more other battery systems (not shown) including low voltage battery systems (e.g., lead-acid 12V automotive batteries) that supply electric energy to a variety of vehicle 100 systems including, for example, vehicle starter systems (e.g., a starter motor), lighting systems, audio systems, and/or the like.

The FC system 102 may be communicatively coupled with an associated a FC control system 108. The FC control system 108 may be configured to monitor and control certain operations of the FC system 102 and/or other associated systems. For example, the FC control 108 system may be configured to monitor and control electric power levels and other operations of the FC system 102. In certain embodiments, the FC control system 108 may be utilized to implement, at least in part, the systems and methods disclosed herein. In further embodiments, an internal vehicle computer system (not shown) and/or any other suitable computer system may be configured to monitor and control certain operations of the FC system 102 and/or implement, at least in part, the systems and methods disclosed herein.

The FC system 102 may be associated with one or more sump systems 106 configured to collect water and/or other liquids from one or more locations in the FC system 102. For example, the one or more sump systems 106 may be configured to collect water and/or other liquids from one or more manifold locations of the FC system 102. In some embodiments, the sump system 106 may be configured to collect water produced as a byproduct of a chemical reaction in a reactor of the FC system 102. The sump system 106 may include a selectively-actuated drain valve configured to remove water and/or other liquids from the sump system 106 for disposal and/or storage (e.g., in a reservoir or the like for reuse in the vehicle and/or the FC system 102). In certain embodiments, the sump system 106 may be communicatively coupled with the FC control system 108 and/or any other suitable system configured to control operations of the sump system 106 and/or the selectively-actuated drain valve.

One or more vehicle orientation sensors 110 may be communicatively coupled to the FC control system 108 and/or the sump system 106 (e.g., via a controller area network ("CAN") bus or the like). As discussed in more detail below, information provided by the one or more vehicle orientation sensors 110 may be utilized by the FC control system 108 and/or the sump system 106 to, among other operations, regulate a fill level and/or a fill volume of the sump system 106 through actuation of the drain valve.

Vehicle orientation sensors 110 may provide a variety of information regarding an orientation of the vehicle 100. For example, vehicle orientation sensors 110 may include one or more vehicle pitch sensors configured to measure a relative pitch angle of the vehicle and/or one or more vehicle roll sensors configured to measure a relative roll angle of the vehicle. In certain embodiments, the vehicle orientation sensors 110 may include one or more analog and/or digital level sensors. Information relating to the pitch and/or roll of the vehicle 100 (e.g., relative tilt angles or the like) may be provided by the vehicle orientation sensors 110 to the FC control system 108 and/or the sump system 106. In further embodiments, the vehicle orientation sensors 110 may include one or more acceleration sensors configured to provide vehicle orientation information (e.g., pitch rate, roll rate, and/or vehicle lateral and/or longitudinal acceleration sensors included as part of a vehicle stability control system). Vehicle orientation information provided by vehicle orientation sensors 110 may include information regarding a static orientation of a vehicle and/or an orientation or change in orientation associated with dynamic vehicle movement.

In yet further embodiments, vehicle orientation information may be generated based on information provided by one or more transmission and/or other drivetrain components and/or control systems included in the vehicle 100. For example, vehicle transmission controls may identify a difference between an expected power level and an actual power level of the vehicle drivetrain 104 at a particular vehicle speed and gear selection. Based on this difference, the transmission controls may determine whether the vehicle 100 is moving up and/or down an incline. Such orientation information may be provided to the FC control system 108 and/or the sump system 106 for use in managing their operation consistent with embodiments disclosed herein.

Consistent with embodiments disclosed herein, the FC control system 108 and/or the sump system 106 may actuate a drain valve included in the sump system 106 to regulate a fill level and/or fill volume of the sump system 106 based on received vehicle orientation information. For example, as discussed in more detail below in reference to FIGS. 2A-2C, at a level orientation (e.g., flat ground), a fill and/or fill volume level of the sump system 106 may be regulated at a default level, whereas in a tilted orientation, the fill and/or fill volume level within the sump 106 may be regulated at an adjusted level that is different than the default level. Regulating the fill and/or volume level in the sump system 106 based on vehicle orientation may mitigate the potential for water and/or other liquids stored in the sump system to escape and reenter one or more locations of the FC system 102.

Figure 2A:
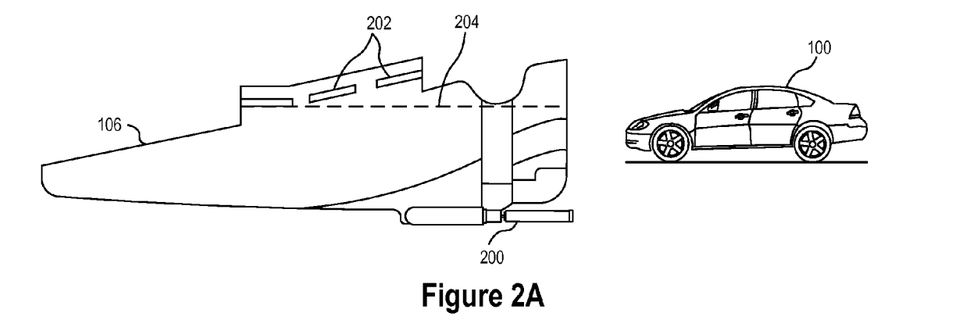
FIG. 2A illustrates an exemplary sump at a level orientation consistent with embodiments disclosed herein.

FIG. 2A illustrates an exemplary sump 106 at a level orientation consistent with embodiments disclosed herein. In certain embodiments, the sump 106 may be configured to collect water and/or other liquids from one or more locations in an FC system. As illustrated, the sump 106 may include a drain valve 200. In some embodiments, the drain valve 200 may be selectively actuated based on control signals generated by a FC control system and/or any other suitable system.

The sump 106 may be configured in a variety of ways. For example, the drain valve 200 may be disposed in a lower portion of the sump 106. In certain embodiments, positioning the drain valve 200 in a lower portion of the sump 106 may facilitate emptying of liquids collected by the sump 106 during drain events (e.g., when the drain valve 200 is opened). One or more baffles 202 included in the sump 106 may be configured to admit water and/or other liquids into the sump while minimizing the potential for the water and/or other liquids to reenter the FC system. In certain embodiments, the sump 106 may have one or more sloped sides and/or baffles configured to allow liquids to collect within the sump 106 proximate to the drain valve 200. It should be appreciated that embodiments of the systems and methods disclosed herein may be implemented in a variety of sump designs and configurations, including sump configurations that include elements different than elements included in the illustrated sump 106.

When opened, the drain valve 200 may allow liquids collected in the sump 106 to drain into a storage reservoir (e.g., for reuse in the vehicle and/or the FC system) and/or a channel for disposal. In certain embodiments, the drain valve 200 and/or one or more systems controlling its operation (e.g., an FC control system or the like) may regulate an amount of liquid within the sump 106 at or below a fill level 204. The fill level 204 may define an effective fill volume of the sump 106. For example, as illustrated, at a level orientation (e.g., a level vehicle orientation), the fill level 204 may be at a level at or near where any additional liquid introduced the sump would reenter the FC system. In certain embodiments, this fill level 204 may be a default fill level defining a default fill volume of the sump 106 when the vehicle 100 and/or the sump 106 are at a level orientation.

Figure 2B:
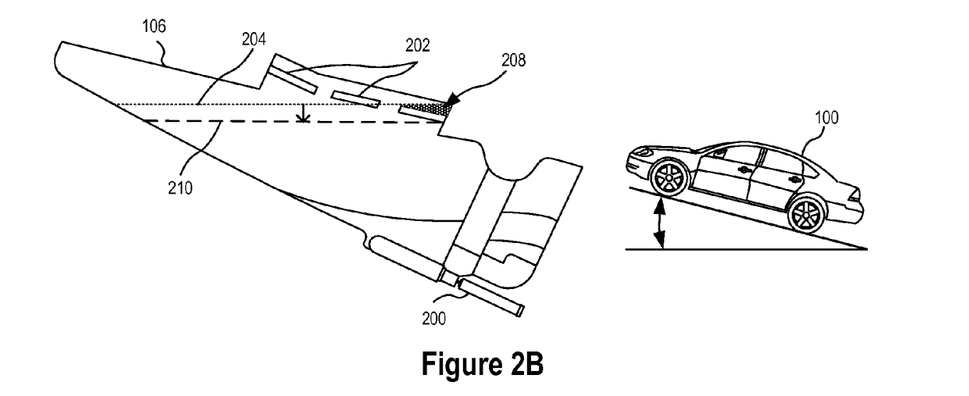
FIG. 2B illustrates an exemplary sump at a tilted orientation consistent with embodiments disclosed herein.

FIG. 2B illustrates an exemplary sump 106 at a tilted orientation consistent with embodiments disclosed herein. Based on the configuration of the sump 106, when tilted in any orientation, the effective fill volume of the sump 106 may change. For example, in the illustrated tilted orientation, a default fill level 204 defining a default effective fill volume of the sump 106 may allow a certain volume of liquid 208 to escape from the sump 106 and reenter the FC system. Consistent with embodiments disclosed herein, to mitigate the potential for liquid escaping the sump 106 and reentering the FC system, an adjusted fill level 210 may be determined based on orientation information relating to the orientation of the vehicle 100 and/or the sump 106 provided by one or more sensors and/or other mechanisms. In certain embodiments, the adjusted fill level 210 may define an adjusted effective fill volume of the sump 106 at the tilted orientation. For example, as illustrated, at the tilted orientation, the adjusted fill level 210 defining the adjusted effective fill volume of the sump 106 may be at a level at or near where any additional liquid introduced the sump would reenter the FC system (e.g., past baffles 202) at the tilted orientation. Although the adjusted fill level 210 is illustrated as being lower than the default fill level 204, it will be appreciated that in certain sump systems, the adjusted fill level 210 may be higher than the default fill level 204 in certain orientations.

One or more systems controlling the operation of the drain valve 200 (e.g., an FC control system or the like) may regulate an amount of liquid within the sump 106 at or below the adjusted fill level 210. For example, due to a reduced adjusted effective fill volume associated with the adjusted fill level 210, the drain valve 200 may be opened more frequently than it would otherwise be opened if it were regulated based on the default fill level 204. In certain embodiments, the adjusted fill level 210 may be calculated based on orientation information received from one or more orientation sensors or other mechanisms associated with the vehicle and/or the sump 106. In further embodiments, the adjusted fill level 210 may be determined based information included in a look-up table associated with the sump system. In some embodiments, the look-up table may associate orientation information with one or more adjusted fill levels.

It will be appreciated that a variety of other techniques may be utilized in determining an adjusted fill level 210, and that any suitable technique may be utilized in embodiments of the systems and methods disclosed herein.

Figure 2C:
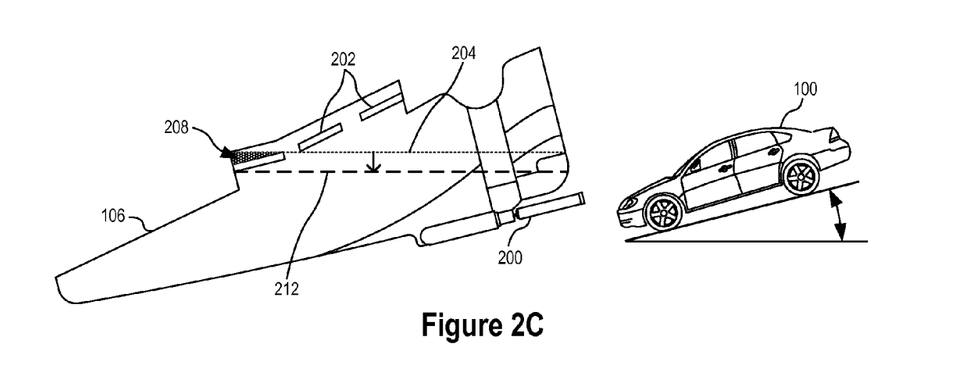
FIG. 2C illustrates an exemplary sump at another tilted orientation consistent with embodiments disclosed herein.

FIG. 2C illustrates an exemplary sump 106 at another tilted orientation consistent with embodiments disclosed herein. As illustrated, a default fill level 204 of the sump 106 while in the tilted orientation may allow certain volume of liquid 208 to escape the sump 106 and reenter the FC system. Consistent with embodiments disclosed herein, to mitigate the potential for liquid escaping the sump 106 and reentering the FC system, an adjusted fill level 212 may be determined based on orientation information. As with the adjusted fill level discussed in reference to FIG. 2B, the adjusted fill level 212 may define an adjusted effective fill volume of the sump 106 at the tilted orientation, and may be used by one or more systems to regulate an amount of liquid within the sump 106 at or below the adjusted fill level 210 through actuation of the drain valve 200.

Figure 3:
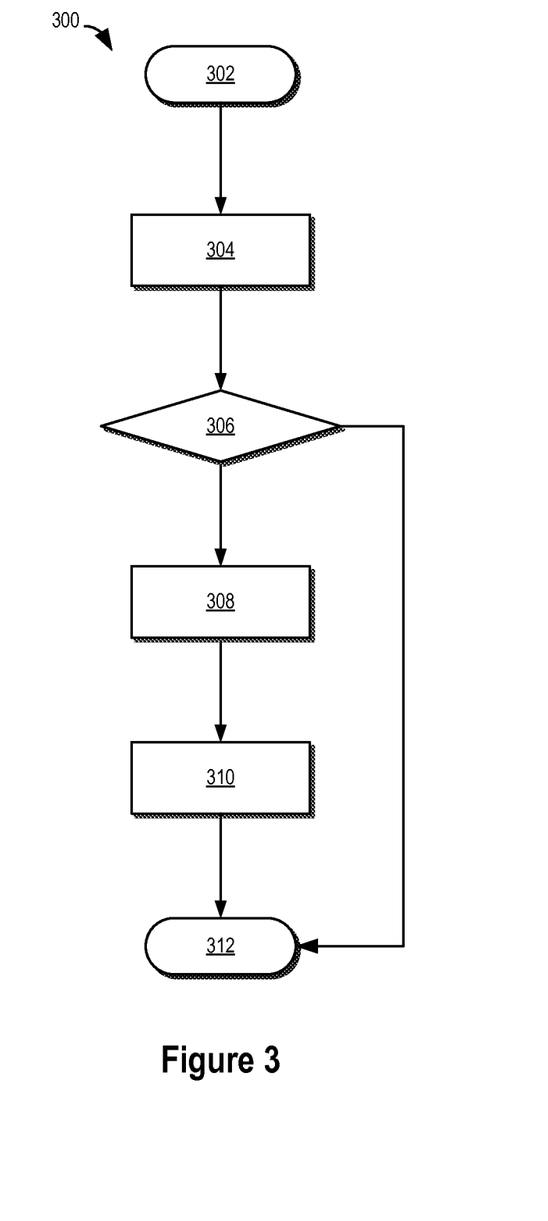
FIG. 3 illustrates a flow chart of an exemplary method for collecting water from a FC system consistent with embodiments disclosed herein.

FIG. 3 illustrates a flow chart of an exemplary method 300 for collecting water and/or other liquids from a FC system consistent with embodiments disclosed herein. The illustrated method 300 may be performed using, at least in part, a vehicle computer system, an external computer system, a FC control system, one or more orientation sensors, a sump system, and/or any other suitable system or systems. At 302, the method 300 may be initiated. At 304, orientation information relating to the vehicle and/or the sump system may be received from one or more orientation sensors. In some embodiments, the one or more orientation sensors may include pitch and/or roll orientation sensors. In further embodiments, the orientation information may be provided by a system that generates orientation information based on information provided by one or more other vehicle systems (e.g., transmission control systems or the like).

At 306, a determination may be made if an adjustment to a default fill level and/or a default effective fill volume of the sump system should occur based on the received orientation information. In certain embodiments, the determination may be based on whether the received orientation information indicates a vehicle and/or sump orientation that exceeds one or more thresholds associated with a default orientation. If an adjustment to the default fill level should not occur, the method may proceed to terminate at 312. If an adjustment should be made, however, the method may proceed to 308.

Based on the received orientation information, at 308, an adjusted fill level and/or adjusted effective fill volume for the sump system may be determined. In certain embodiments, the adjusted fill level and/or adjusted effective fill volume may be determined based information included in a look-up table associated with the sump system. In some embodiments, the look-up table may associate orientation information with one or more adjusted fill levels and/or adjusted effective fill volumes. Based on the received orientation information, an adjusted fill level and/or adjusted effective fill volume may be determined using the look-up table. It will be appreciated that a variety of other techniques may be utilized in determining an adjusted fill level and/or adjusted fill volume based on received orientation information, and that any suitable technique may be utilized in embodiments of the systems and methods disclosed herein.

At 310, a drain valve of the sump system may be actuated based on the determined adjusted fill level and/or adjusted effective fill volume. For example, the drain valve may be actuated to regulate an amount of liquid within the sump at or below the adjusted fill level and/or adjusted effective fill volume. In certain embodiments, actuating the drain valve based on the adjusted fill level and/or adjusted effective fill volume may result in more or less frequent drain events than under default fill level and/or effective fill volume conditions. By actuating the drain valve and regulating the fill and/or volume level in the sump according to adjusted levels determined based on vehicle and/or sump orientation information, the potential for water and/or other liquids stored in the sump to escape and reenter one or more locations of the FC system may be mitigated.

In further embodiments, one or more control actions may also be taken based on determined adjusted fill levels, adjusted effective fill volumes, and/or orientation information. For example, certain vehicle diagnostic trouble codes ("DTCs") may be asserted and/or not asserted (e.g., suppressed) by a vehicle computer system based on the adjusted fill levels, adjusted effective fill volumes, and/or orientation information. Automatic stack reconditioning may be delayed or modified based on orientation information, adjusted fill levels, and/or adjusted effective fill volumes. Relative humidity setpoints and/or pressure setpoints (e.g., anode and/or cathode pressure setpoints) of the FC system may be adjusted based on the orientation information, adjusted fill levels, and/or adjusted effective fill volumes. In yet further embodiments, FC startup and/or shutdown processes may be changed from default processes based on the orientation information and/or the adjusted fill levels, and/or adjusted effective fill volumes. Regulating a drain valve of a sump system consistent with embodiments disclosed herein may, among other things, allow for improved FC system efficiency, fewer failed FC system starts and/or faults, and/or less FC system freeze and/or flooding issues. Further, embodiments disclosed herein may allow for a sump system and/or a FC system to be installed at a variety of default angles and/or orientations without significantly affecting the performance of the sump system (e.g., a standard FC system installed in different vehicle types or models).

Figure 4:
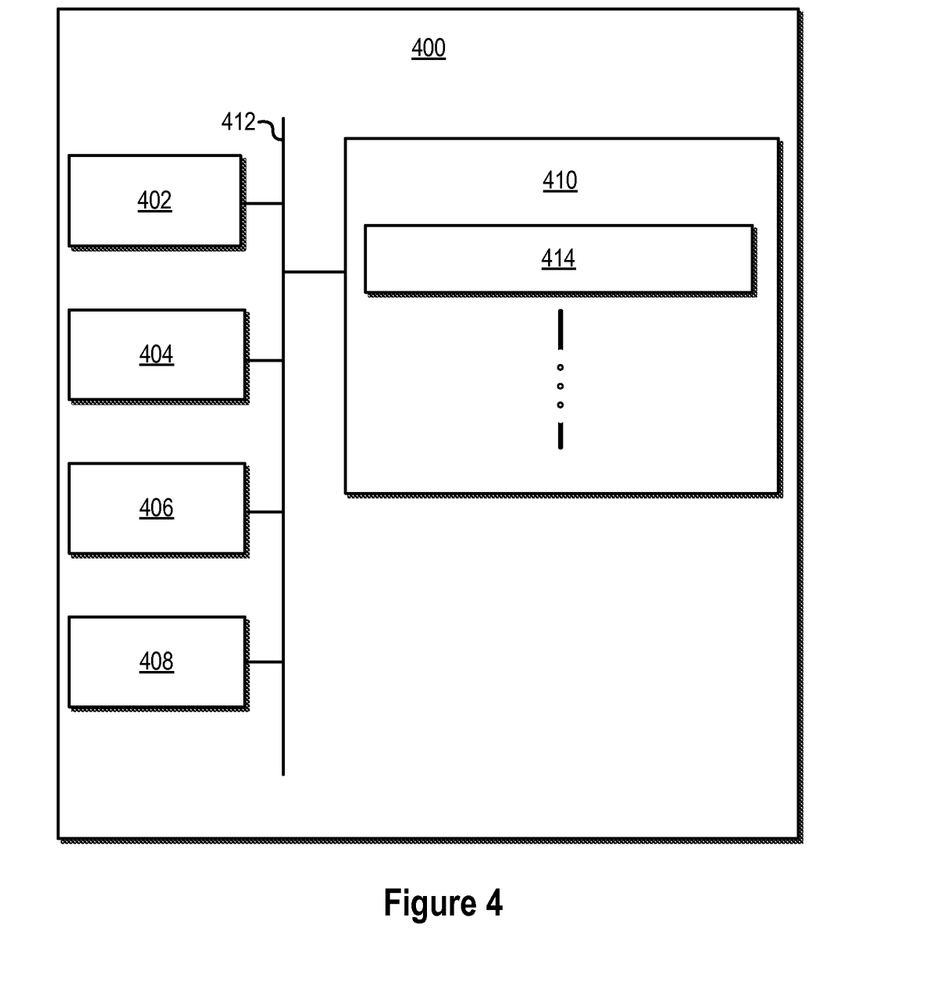
FIG. 4 illustrates a block diagram of an exemplary computer system that may be utilized in implementing certain embodiments of the systems and methods disclosed herein.

In still further embodiments, systems and methods disclosed herein may be utilized to mitigate gasses (e.g., anode and/or cathode gas streams) from escaping through a drain valve of a sump system. For example, in some embodiments, a drain valve may be configured to close during a sump drain event prior to the sump system being fully drained of liquid. In certain embodiments, this may mitigate the loss of air and/or fuel (e.g., hydrogen) through the valve. Accordingly, in some embodiments, actuation of the drain valve may take into account a sump fill level and/or fill volume configured to mitigate the escape of gasses from the sump while regulating the fill level and/or volume based on an orientation and/or a longitudinal and/or lateral acceleration rate of the vehicle FIG. 4 illustrates a block diagram of a computer system 400 that may be utilized in implementing certain embodiments of the systems and methods disclosed herein. In certain embodiments, the computer system 400 may be a personal computer system, a server computer system, an on-board vehicle computer, an FC control system, and/or any other type of system suitable for implementing the disclosed systems and methods. As illustrated, the computer system 400 may include, among other things, one or more processors 402, random access memory ("RAM") 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

User interface 408 may include any number of devices allowing a user to interact with the computer system 400. For example, user interface 408 may be used to display an interactive interface to a user. The user interface 408 may be a separate interface system communicatively coupled with the computer system 400 or, alternatively, may be an integrated system such as a display interface for a laptop, a display integrated into a vehicle, or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to computer system 400. For example, the communications interface 406 may allow the computer system 400 to communicate with other computer systems (e.g., computer systems associated with external databases and/or the Internet) and/or a variety of vehicle sensors (e.g., orientation sensors) allowing for the transfer as well as reception of data from such systems and sensors. The communications interface 406 may include, among other things, a modem, a satellite data transmission system, an Ethernet card, and/or any other suitable device that enables the computer system 400 to connect to databases and networks, such as LANs, MANs, WANs and the Internet.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules 414 configured to implement all or part of the functionality of the systems and methods described above. Specific functional models 414 that may be stored on computer-readable storage medium 410 include a FC control module, a drain valve actuation module, a look-up table module, and/or an adjusted fill level determination module configured to implement, at least in part, the functionality described in connection with various embodiments of the present disclosure.

The system and methods described herein may be implemented independent of the programming language used to create the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands (e.g., including driver's use of vehicle controls such as an accelerator, steering wheel, brake, and/or other controls), results of previous processing, or a request made by another processing machine. It will be appreciated that computer system 400 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. For example, in certain embodiments, the systems and methods disclosed herein may be utilized in a variety of sump systems associated with other vehicle systems (e.g., air conditioning units or the like). Additionally, certain systems and/or methods disclosed herein may be utilized in sump systems not included in a vehicle. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method for regulating a sump system comprising:
   initiating a sump drain event by actuating a drain valve of the sump system;
   receiving orientation information from one or more orientation sensors;
   determining an adjusted sump drain termination fill level in the sump system based on the orientation information; and
   terminating the sump drain event by actuating the drain valve of the sump system to maintain a level of liquid in the sump system at or above the adjusted sump drain termination fill level.

2. The method of claim 1, wherein the adjusted sump drain termination fill level defines an effective volume of the sump system at a particular orientation associated with the orientation information to prevent the loss of fuel cell reactants through the drain valve.

3. The method of claim 1, wherein the orientation information comprises sump system orientation information.

4. The method of claim 1, wherein the sump system is included in a vehicle and the orientation information comprises vehicle orientation information.

5. The method of claim 1, wherein the adjusted sump drain termination fill level is determined based on the orientation information using a look-up table associated with the sump system.

6. The method of claim 1, wherein the orientation information comprises, pitch angle information and roll angle information.

7. A system comprising:
   a fuel cell system;
   a sump system coupled to the fuel cell system configured to collect liquid from the fuel cell system, the sump system comprising a drain valve configured to selectively remove liquid from the sump system when actuated; and
   a fuel cell control system communicatively coupled to the drain valve, the fuel cell control system programmed to terminate a sump drain event by selectively actuating the drain valve to maintain a level of liquid in the sump system at or above a sump drain termination fill level determined based on orientation information received from one or more orientation sensors.

8. The system of claim 7, wherein the fuel cell control system is programmed to determine the adjusted sump drain termination fill level based on the orientation information using a look-up table associated with the sump system.

9. The system of claim 7, wherein the sump system is included in a vehicle and the orientation information comprises vehicle orientation information.

10. The system of claim 7, wherein the orientation information comprises at least one of sump system orientation information, pitch angle information and roll angle information.

11. A vehicle comprising:
    a fuel cell system configured to provide electrical energy for the vehicle;
    a sump system coupled to the fuel cell system configured to collect liquid from the fuel cell system, the sump system comprising a drain valve configured to selectively remove liquid from the sump system when actuated; and
    a fuel cell control system communicatively coupled to the drain valve, the fuel cell control system programmed to terminate a sump drain event by selectively actuating the drain valve to maintain a level of liquid in the sump system at or above a sump drain termination fill level determined based on orientation information received from one or more orientation sensors.

* * * * *